United States Patent [19]
Dosne

[11] 3,910,657
[45] Oct. 7, 1975

[54] ROLLING MEMBERS PRESTRESSED BY A RADIALLY RESILIENT RING

[75] Inventor: Daniel Dosne, Meudon, France

[73] Assignee: Societe Nouvelle de Roulements, Annecy, France

[22] Filed: Feb. 20, 1974

[21] Appl. No.: 444,224

[30] Foreign Application Priority Data
Mar. 26, 1973  France .............................. 73.10823

[52] U.S. Cl. ............................................. 308/216
[51] Int. Cl.² ........................................ F16C 33/58
[58] Field of Search ............ 308/207 A, 189 R, 216

[56] References Cited
UNITED STATES PATENTS

| | | | |
|---|---|---|---|
| 610,436 | 9/1898 | Dickinson | 308/216 |
| 2,244,197 | 6/1941 | Hessler | 308/216 |
| 2,928,702 | 3/1960 | Pitner | 308/216 X |
| 2,947,196 | 8/1960 | Dorn et al. | 308/216 |
| 3,336,057 | 8/1967 | Bloomquist | 308/216 |
| 3,762,783 | 10/1973 | Hay | 308/207 |

*Primary Examiner*—Lloyd L. King

[57] ABSTRACT

A cageless bearing whose rolling members are mounted continuously between two rings one of which is rigid and the other of which is a radially resilient ring which subjects the rolling members to a predetermined prestressing, the length of the free portion of the resilient ring or of its part lying between its end mounting being at least about three times the length of its contact generatrix with the cylindrical rolling members at least about three times the width of the groove when the rolling members are formed by balls.

8 Claims, 4 Drawing Figures

ROLLING MEMBERS PRESTRESSED BY A RADIALLY RESILIENT RING

BACKGROUND OF THE INVENTION

1. Field of the Invention

This invention relates to a bearing enabling the forces exerted on a member rotating inside a casing to be absorbed; amongst other applications, the rotating member can be a machine spindle. The bearing also has the feature of preserving its initial characteristics whatever the speed of rotation of the rotating member may be and even if the latter becomes slightly heated.

2. Background of the Invention

Antifriction bearings of the type employing rolling bearing members are, of course, well-known. These may, for example, be straight or angular contact ball bearings, cylindrical conical roller bearings, or needle bearings. Roller and needle bearings can incorporate a stop or not. As a rule, conventional roller bearings comprise an outer ring received in a groove in the casing and, in the majority of cases, an inner ring positioned against a shoulder of the rotating member, the two rings forming a race for the rolling members disposed between them.

The main disadvantage of the conventional bearings of this type is the considerable rise in temperature experienced when operating at high rotational speeds. Since the temperature of the rotating member rises more considerably than that of the bearings or the casing, the rolling members are clamped in a way which may cause the bearings to deteriorate.

If use is made of cylindrical roller bearings, during assembly the bearing clearance must be adjusted in dependence on the intended speed of use. Clearly, a larger operational clearance at rest must be provided for a high speed of rotation than for a low one. Consequently, elements intended for different rotational conditions are generally not interchangeable.

However, cylindrical roller bearings are known for very high speeds which have hollow rollers allowing some prestressing, so as to prevent the rollers from becoming detached from the inner ring in the unloaded zones and stopping rotation until they are again rotated in a loaded zone. The prestressing is such that even in the unloaded zones the roller is kept bearing against the inner, rotating ring. Roller detachments are one of the main causes of the short life of bearings, since wear is caused by the contact-resuming accelerations of the rollers following on detachment. However, hollow rollers have two disadvantages: on the one hand, in view of their small diameter, the dimensional prestressing can only be small, and on the other, the hollow in the roller axis considerably reduces the rigidity of the bearing, and this may be impermissible in some applications such as, for instance, machine tool spindles. As a rule ball bearings are free from the disadvantage of roller bearings and can be so preloaded as to enable them to be used at any speed without the need for adjustment. On the other hand, their capacity is low, and this often limits their applications and/or life.

Hydrodynamic bearings are also known. They consume a large amount of power at high speed and cannot operate at very low speeds. They also have the disadvantage of rarely being autonomous, since very often they require the supporting fluid to be cooled.

Hydrostatic and aerostatic bearings are also known. Their main disadvantage is lack of autonomy, since they require a pressure generator for the supporting fluid used.

SUMMARY OF THE INVENTION

The bearing according to the invention is formed by at least one row of rolling members, rolling with the interposition of a ring or directly on the one hand on a smooth bearing surface either of the rotating member or of the bore of the casing, and on the other hand on a race formed either inside or outside a radially resilient thin ring against which the rolling members are mounted with radial prestressing.

In dependence on the particular need, therefore, the resilient ring acts as an outer ring with or without the use of an inner ring, or as an inner ring with or without the use of an outer ring. It is mounted either overhung and in suitable shape to be fixed and diametrically centered either on the casing or on the rotating member, in dependence on whether it is acting as an outer or inner ring, or centered by its two end flanges, enabling its central portion to be radially resilient formed in the bore or mounting shaft, by a suitable surface detachment.

In a preferred embodiment of the invention, the rolling members are trapped in the center of a wide thin bearing surface of the resilient ring disposed opposite its centering and are laterally guided by their end faces via the agency of stops formed by shoulders with which one or the other of the two races can be formed. Clearly, use can be made of other means, conventional or not, for guiding the rolling members.

More precisely, the resilient ring in the bearing according to the invention co prises a novel combination of the following features determined by experience:

1. The relation between the thickness $e$ of the ring and its diameter $\phi$ substantially satisfies the equation $e = 2.5 + 0.02\ \phi$ where all dimensions being in millimeters.

2. The ring exerts on the rolling members a prestressing or diametrical clamping initially of the order of 0.001–0.05 mm, measuring the distance between the inner bore of the ring and the diameter of the generated surface of the rolling members.

3. The length of the free portion of the ring, when it is fixed at one of its ends, is such that the ring can be deformed without excessive stressing of the rolling members; to this end the length must be of the order of three times or preferably greater than three times the length of its contact generatrix with the cylindrical rolling members, or greater than three times the width of the groove in its inner bore in cases in which the rolling members are formed by balls folling in such groove.

From the foregoing it can be deduced that:

1. The bearing according to the invention is formed by at least one row of rolling members which rotate between two races, and is characterized in that one of the races is rigid and the other is disposed substantially in the central portion of a resilient ring extending on either side of such race, the rolling members being mounted with prestressing against the resilient ring by a clamping of the order of 0.001–0.05 mm, corresponding to the resilient radial deformation of the ring in the zone of the race.

2. If required, the resilient ring is rigidly centered at one end, the other end being free, and the ring is radially deformable over a width greater than or equal to three times the length of the contact generatrix with the rolling members disposed in the central portion of such width and has a thickness $e$ substantially satisfying the equation $e = 2.5 + 0.02 \phi$ in relation to its diameter at the level of the contact surface of the rolling members.

3. When needful, the resilient deformable portion of the resilient ring is slightly retracted in relation to two flanges rigidly centered on the assembly of the bearing, so that such central portion can still be diametrically deformed.

4. The resilient ring can form the outer ring of the bearing, the rigid race forming an integral part of the member on which the bearing is mounted.

5. The resilient ring can form the inner ring of the bearing, the rigid race forming an integral part of the member in which the bearing is mounted.

In a preferred embodiment, when the bearing according to the invention is used to guide a machine tool spindle in its casing, the spindle forms the rotating member and the rotating members are cylindrical rollers. The rollers roll on the one hand directly on a smooth bearing surface of a spindle, and on the other on a race disposed inside the resilient ring. The latter can therefore be considered to be an outer ring. It is diametrically centered by a cylindrical bearing surface fitting without clearance into the bore in the casing and has a circular collar via the agency of which it is kept bearing against the lateral surface of the casing via a fixing flange. It is also mounted with diametrical prestressing of between 0.001 and 0.05 mm on the rollers. This latter information, and the details given hereafter, also apply and can therefore be transposed to the inverse assembly - i.e., when the resilient ring is used as an inner ring.

The main feature of the resilient ring is to have a ratio between its thickness and inside diameter such that it acquires some circumferential flexibility at the level of the rollers which enables it to be deformed under their thrust, while absorbing the radial expansion of the spindle and rollers, and while maintaining suitable stressing and high radial rigidity. The free end of the resilient ring opposite the fixing extends far beyond the end of the rollers, so that the resilient ring can be deformed only at the level of the rollers by the spindle and roller expansion pressure, and cannot tend to flare out, an event which would jam the rollers with disastrous consequences. This free end of the resilient ring is also advantageously used to receive the spindle bearing gland.

Actually, the resilient ring takes the form of a highly radially resilient envelope - i.e., it can readily increase or reduce its diameter, while remaining strictly circular, under the forces (inside forces in the preferred embodiment, outside forces in the inverse case) exerted by the rollers and/or spindle. However, it also represents a member very rigid under bending and shearing, due to its large diameter and its being fitted into the casing, and also due to its considerable section of metal. In addition, the thinness of the resilient ring, combined with the uniform distribution of pressure by the rollers, enables its own shape defects to be ignored.

Clearly, for any given diameter of the spindle and rolling members, the stressing at the level of contact of the rollers and spindle depends on the inside radius and thickness of the resilient ring. However, it can be shown by the classical formulae of mechanics that such maximum surface stressing varies little, in such conditions, when on the one hand the clamping of the resilient ring on to the rolling members and on the other the thickness of the resilient ring vary. Since moreover the bearing is always very rigid, due to the large diameter of the resilient ring, in practice thin resilient rings of wide dimensional tolerances can always be selected. This diameter to thickness ratio is expressed by the aforementioned formula $e = 2.5 + 0.02 \phi$.

Since the dilation of the spindle and rollers is constantly absorbed by the deformation of the resilient ring, a bearing is obtained which allows a wide range of conditions of utilization and obviates the preadjustment of the operational clearance in dependence on the required speed of rotation, thus affording great flexibility of use. In practice the bearing has no lower limit as regards speed of rotation, and since little heat is evolved, ue to the absence of a cage, its upper limit is clearly higher than that of the conventional bearings. It has great possibilities of radial loading, and the two bearings required to guide a spindle need not be perfectly aligned during assembly.

In applications in which it comprises neither an inner ring (or an outer ring, in dependence on the intended use) or a cage, there are still other advantages. Its cost price is less than that of a bearing of conventional type. It takes up little space radially or axially, so that reduced interaxil distances can be used between the spindles, the overhang of the spindle nose can be reduced and the rigidity of the spindle increased, so that the spindle can be of large diameter for identical general overall size.

Conventional roller bearings require the use of axial stops whose housings must be machined in the bores of the spindle-carrying casing. The bearing according to the invention enables the stops to be incorporated in the resilient ring of the radial bearing, thus much simplifying the machining of the casing and further contributing towards reducing the cost price.

BRIEF DESCRIPTION OF THE DRAWINGS

Other details of the invention will also be gathered from the following description of preferred embodiments of a machine spindle bearing of the kind specified as illustrated in the accompanying drawings, wherein.

DESCRIPTION OF THE PREFERRED EMBODIMENTS

Figure 1:
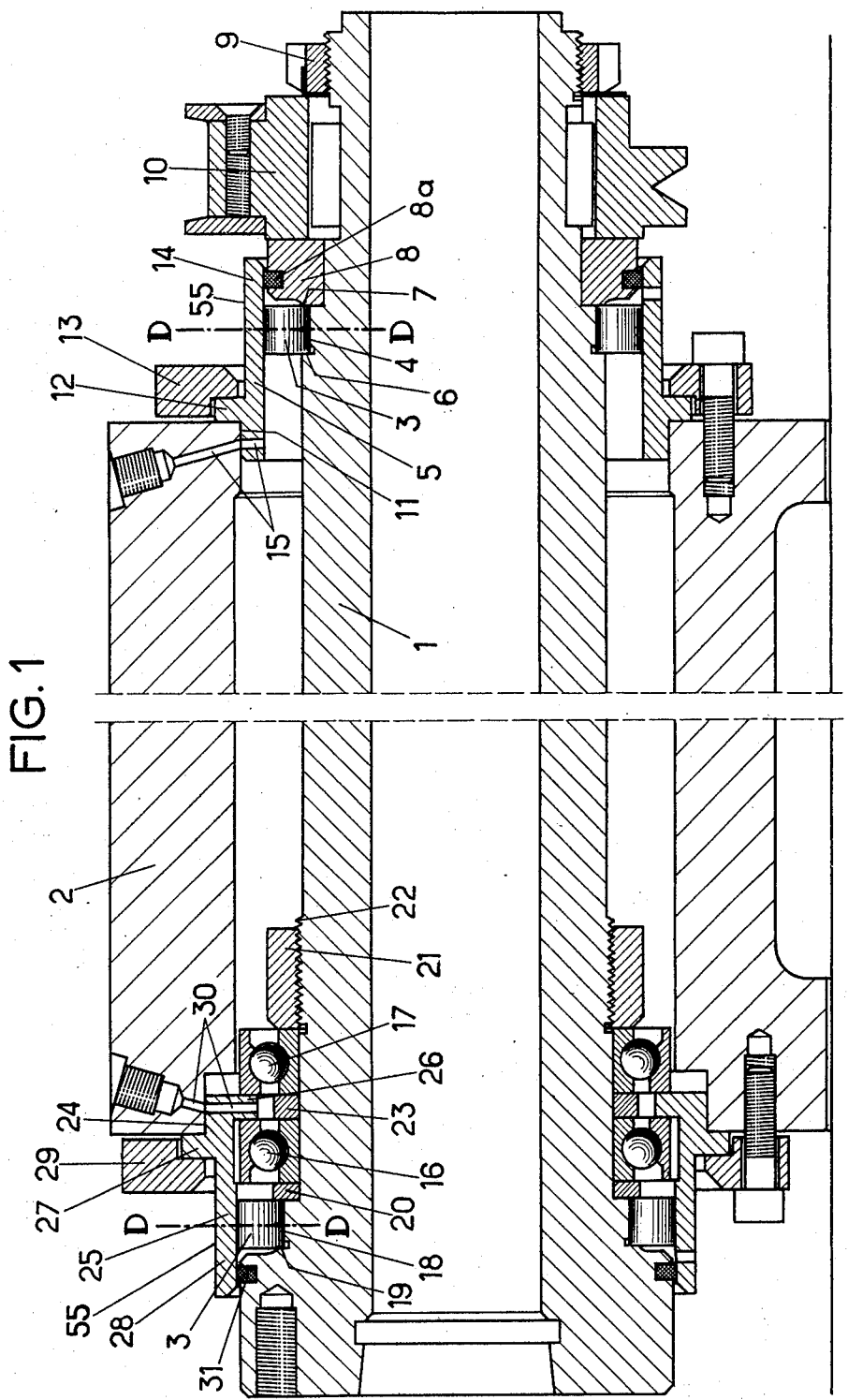
FIG. 1 is a longitudinal section through a machine spindle having the bearing according to the invention connected to a double stop with angular contact balls.

Referring to FIG. 1, a spindle 1 rotates inside a casing 2 via the agency of bearings. The rear bearing is formed by a row of contiguous cylindrical rollers 3 directly rolling on the one hand on a smooth bearing surface 4 of the spindle 1, and on the other hand inside a resilient ring 5 which retains them in position around the spindle 1. The cylindrical rollers 3 are guided laterally over a portion of their end faces on the one hand by a shoulder 6 of the spindle 1 and on the other by a bearing face 7 of support 8 of a gland 8a retained in position by a braked nut 9 locking pulley 10 on the spindle 1.

The resilient ring, mounted overhung, is made up successively of a cylindrical bearing surface 11 centering the ring diametrically by assembly without clearance in the bore of the casing 2, an outer circular collar 12 which fastens the ring bearing against the rear lateral face of the casing 2 via the agency of an attaching flange 13 locked by a screw on to the casing 2, and lastly a second cylindrical bearing portion 14 which is long and thin, inside and at the center of which the rollers 3 roll. The gland 8a of the bearing is received beneath the free end 14 of the resilient ring 5.

A lubricating duct 15 extends through the rear upper portion of the casing 2 and also the cylindrical bearing surface 11 of the outer ring 5 to discharge inside the ring 5 and lubricate the rollers 3. However, lubrication can be performed in other ways.

The relationship of the thickness $e$ of the ring 5 to the diameter $\phi$ of its bore is determined by the equation $e = 2.5 + 0.02 \phi$. The length $l$ of its free portion 55 (i.e., from the collar 12 to the free end thereof) is preferably equal to approximately three times the length $d$ of the roller 3, which is also the length of the contact generatrix between the bore of the ring and the outer surface of the roller. In the embodiment illustrated the ring is prestressed to enlarge the diameter by 0.02 mm.

Figure 2:
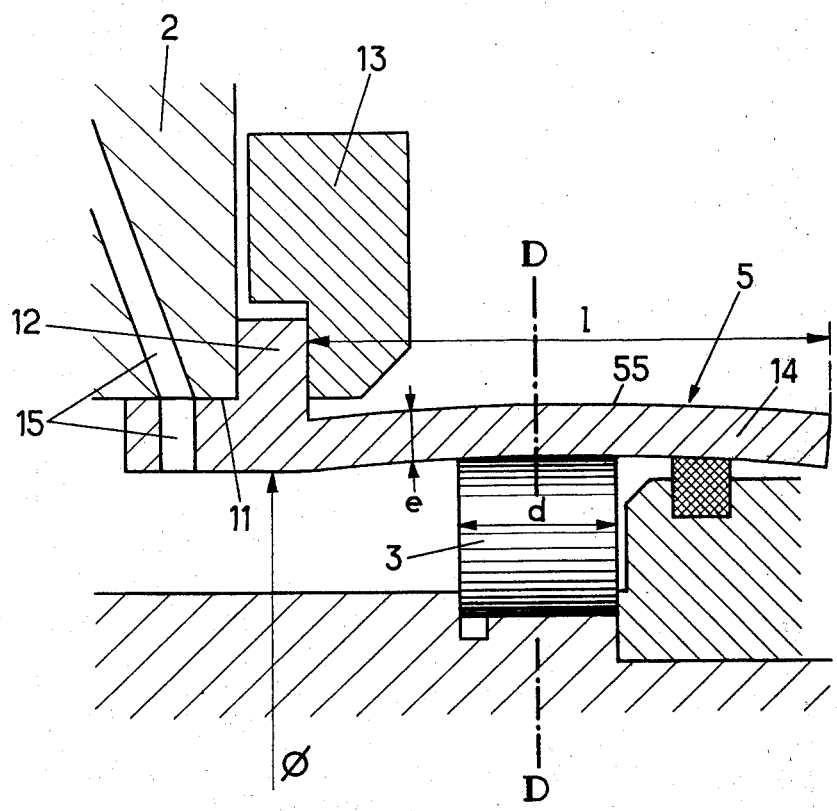
FIG. 2 illustrates diagrammatically the resilient cage fixed at one end and becoming slightly bowed when subjected to bending and expansion.

FIG. 2 illustrates, to a greatly enlarged and exaggerated scale, the slight bowing assumed by the free portion of the ring fixed at one of its ends when the rollers are under stress. In operation the maximum bowing caused by expansion and bending is disposed substantially in the radial plane D—D extending through the center of contact line of the rollers with the resilient ring race.

The front bearing is a variant of the bearing according to the invention associated with a stop formed by two oppositely mounted angular contact ball bearings 16, 17 adapted to absorb the axial forces which the spindle 1 is subjected, the ball bearings 16, 17 being mounted radially free in relation to the resilient ring 25 and the casing 2. It contains the main elements forming the rear bearing. The cylindrical rollers 3 rolling directly on the smooth bearing surface 18 of the spindle 1 are guided laterally over a portion of their end faces, on the one hand by shoulder 19 of rear face of the spindle nose, and on the other by the bearing washer 20 retaining in position the inner rings of the bearings 16, 17 which are locked in traversing by a nut 21 screwed on to the screw threaded portion 22 of the spindle 1 and separated by a bracing washer 23. This assembly is not limitative, and other locking means can be used.

The cylindrical centering bearing surface 24 for the resilient ring 25 in the bore of the casing 2 comprises an inner circular collar 26 forming an axial support and also a strut for the outer rings of the bearings 16, 17. On the other hand, the outer circular collar 27 and the cylindrical bearing surface 28 and the resilient ring 25, and also the fixing flange 29 are identical, apart from dimensions, with the outer circular collar 12 and the cylindrical bearing surface 14 of the resilient ring 5, and also the fixing flange 13. They perform the same functions and have the same features.

The inner circular collar 26 thus ensures the positioning and axial offsetting of the spindle by the ball stops 16, 17 whose outer rings, mounted simply bearing against the collar 26, can be freely centered, thus eliminating any risk that the balls will be jammed between their rings during operation. The axial clearance will be eliminated by mounting the bearings with axial prestressing, the free rings exerting a pinching effect on the bracing collar 26.

As in the case of the rear bearing, a lubricating duct 30 extends through the front upper portion of the casing 2 and also the cylindrical bearing surface 24 and the inner circular collar 26 of the resilient ring 25 to discharge between the bearings 16, 17 and lubricate the front bearing assembly, although any other method of lubrication can be used. Moreover, the gland 31 of the bearing which is received beneath the free end 28 of the race of the elastic ring 25 is included in the nose of the spindle 1 mounted in the bearing, this feature allowing a further saving of space longitudinally. However, this assembly is not limitative, and other methods of sealing can be used.

Figure 3:
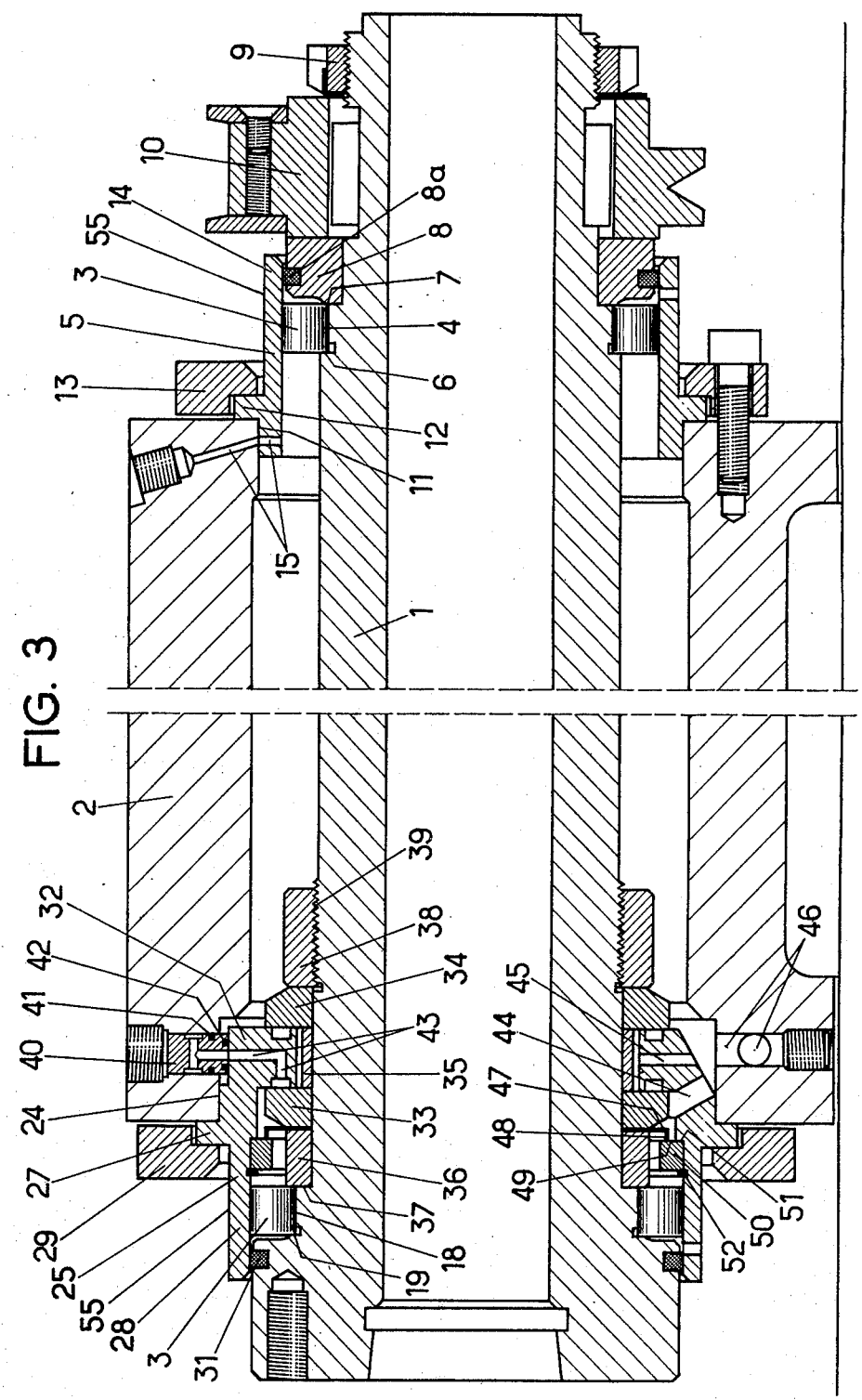
FIG. 3 is a longitudinal section through a machine spindle having the bearing according to the invention connected to a hydrostatic stop.

FIG. 3 illustrates a variant in which the spindle has bearings according to the invention mounted in association with a hydrostatic stop adapted to absorb the axial loads of the spindle 1, taking the place of the ball stop formed by the bearings 16, 17 illustrated in FIG. 1. This type of assembly is not limitative and is of course applicable to any kind of known or future stop, more particularly roller, needle, hydrodynamic and aerostatic stops. In the variant illustrated in FIG. 3, the rear bearing is strictly identical with that illustrated in FIG. 1.

The design and functions of the resilient ring 25 of the front bearing illustrated in FIG. 3 are identical with those of the resilient ring of the front bearing illustrated in FIG. 1. The outer circular collar 27 and the cylindrical bearing portion 28 and also the fixing flange or ring 29 are identical, and the inner curcular collar 26 of the cylindrical bearing surface 24 illustrated in FIG. 1 is simply adapted to form the annular member 32 of the hydrostatic bearing illustrated in FIG. 3. The inner circular collar 26 and the annular member 32 ensure the same axial stop function. The inner circular collar of the resilient ring can therefore be constructed to act as a hydrostatic stop, bearing stop, or the like. In the case of a hydrostatic stop the oil feed cavities forming supporting shoes will advantageously be provided on the faces of the collar 32 and so disposed, as regards number and surface, as to reduce to the maximum the surface of sheared oil film, while remaining compatible with the loads to be withstood. The resilient ring can therefore have or not have at its rigidly fixed end a radial collar disposed on the side of the race of the rolling members and acting as a supporting strut between two axial stop elements. The two axial stop elements can be two axially prestressed angular contact ball bearings one of whose rings is centered, the other being free. These two axial stop elements can also be the cheeks of a hydrostatic stop whose supporting fluid feed is provided in the collar and feeds the cavities forming supporting shoes on each lateral face of the collar.

The hydrostatic bearing is of conventional construction and operation. It comprises two cheeks 33, 34 disposed with a small longitudinal clearance on either side of the annular member 32, each of the cheeks bearing against one of the end faces of a strut 35 received with considerable radial clearance inside the central bore of the annular member 32. The assembly formed by the cheeks 33, 34 and the strut 35 is prevented from rotating or making a traversing movement on the spindle 1 by the strut 36 bearing against shoulder 37 of the spindle 1 and also by the nut 38 screwed on to screwthreaded portion 39 of the spindle 1. The strut 36 also acts as a lateral guide for one of the end faces of the rollers 3 rolling directly on a smooth bearing surface 18 of the spindle 1, the other end face of the rollers 3 being guided by shoulder 19 of the rear face of the spindle nose. This assembly is not limitative, and other means for guiding the rollers and locking the assembly can be used.

Feed of support fluid (oil) to the hydrostatic bearing is performed by a jet 40 having toroidal glands 41, 42 and received inside a duct machined in the upper portion of the casing 2. The fluid is channeled inside the annular member 32 before being used by an assembly of ducts 43 and, after being used, by ducts 44, 45, whereafter it is evacuated via an assembly of discharge ducts 46 with which the base of the casing 2 is formed. The fluid is also channeled, upstream of the hydrostatic bearing, by a rotary deflector 47 of thin sheet metal interposed between the cheek 33 and the strut 36, its peripheral end 48 bearing against a lateral face 49 of a ring 50 immobilized inside the bore of the resilient ring 25 on the one hand by a shoulder 51, and on the other by a locking ring 52 received in a circular groove in the bore.

Like that illustrated in FIG. 1, the front bearing comprises a lubricating duct (not shown) for the rollers 3 and a gland 31 included in the spindle nose, although any other method of lubrication and sealing can be used. The rotary deflector 47 prevents an excessive amount of oil from reaching the rollers 3 of the front bearing. As regards the rear bearing, the difference in level is enough to prevent supporting oil for the hydrostatic bearing from getting on to the rollers 3.

In cases in which the resilient ring of the bearing according to the invention is rigidly centered by its two end flanges, the double centering guarantees the "barrel" deformation of the central portion under the pressure of the rolling members, this feature allowing greater freedom in the selection of portions, length, thickness and diameter of the resiliently deformable central portion of the ring, the only limitations being the physical properties of the materials of which the ring and rolling members are made and the stressing limits occurring in each particular case. These proportions can be calculated in the conventional ways for the strength of materials.

Figure 4:
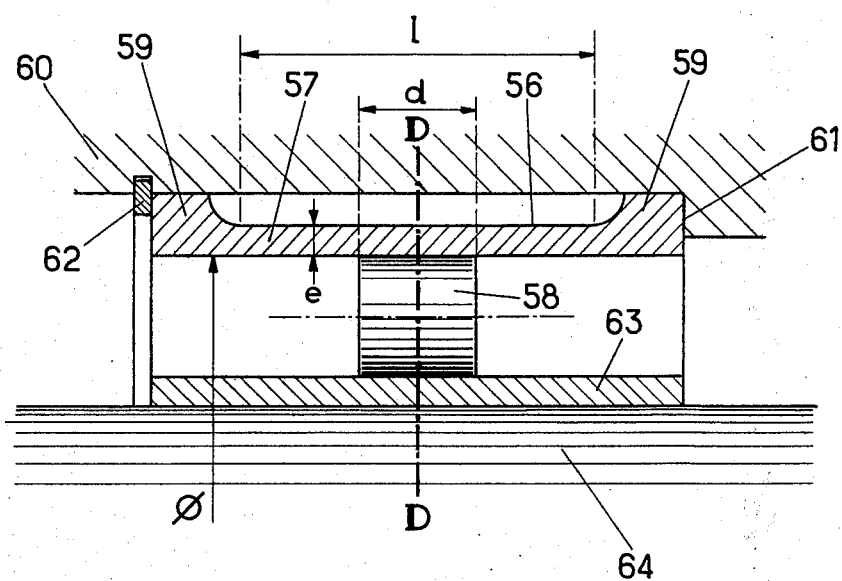
FIG. 4 is a diagrammatic view of the bearing according to the invention comprising a resilient ring centered at both ends.

An application of this kind will now be described with reference to the variant diagrammatically illustrated in FIG. 4. FIG. 4 shows how the resilient deformable bearing surface 56 of a resilient ring 57, meeting the aforementioned criteria as regards its length l and thickness e, and inside and at the center of which the rollers 58 roll, is bounded by two flanges 59 whose outer diameter is slightly greater than that of the bearing surface 56 and which are adjusted in the bore of casing 60, although the bearing surface 56 can still be diametrically deformed. The resilient ring 57 is prevented from making traversing movements inside the bore of the casing 60 by a shoulder 61 and also by a locking ring 62 received in a circular groove in the bore, and a rigid inner ring 63 is interposed between the rollers 58 and spindle 64.

The result is a bearing whose rolling members are always stressed and therefore have no radial clearance, whether at rest or at any speed of rotation.

What is claimed is:

1. An antifriction bearing of the type including at least one row of cylindrical rollers mounted for rotation between two inner and outer races, the inner race being rigid and the outer race being defined by and disposed substantially in the central portion of an elongated, substantially cylindrical resilient ring extending axially on either side of said inner race, said outer ring being rigidly mounted at one end and free at the other end and being radially deformable over a width at least about three times the length of the contact generatrix with the cylindrical rollers disposed in said central deformation portion of the elastic outer ring, said portion having a thickness $e$ substantially satisfying the equation $e = 2.5 + 0.02\ \phi$ at the point of the contact surface of the cylindrical rollers, $\phi$ being the internal diameter of the deformable portion of the outer ring and all dimensions being in millimeters, the said deformable portion of the resilient outer ring exerting on the cylindrical rollers a prestressing or diametrical clamping initially of the order of $0.001 - 0.05$ mm, measuring the distance between the inner bore of the outer ring and the diameter of the generated surface of the cylindrical rollers.

2. A bearing as set forth in claim 1, further comprising means rigidly centering said resilient ring at each of its ends.

3. A bearing as set forth in claim 2, wherein said resilient deformable portion of the resilient ring is of a slightly different diameter in relation to two flanges rigidly centered on the assembly of the bearing, whereby said central portion can still be diametrically deformed.

4. A bearing as set forth in claim 1, further comprising a bearing gland mounted between the free end of the resilient ring and said rolling members.

5. A bearing as set forth in claim 4, wherein said one race is formed on a surface of a spindle mounted in said bearing, and wherein said bearing gland is mounted on said spindle.

6. A bearing as set forth in claim 1, further comprising two axial stop members, said resilient ring comprises at its rigidly mounted end a radial collar disposed on the rolling member race side thereof and acting as a supporting strut between said two axial stop elements.

7. A bearing as set forth in claim 6, wherein said two axial stop elements comprise two axially prestressed angular contact ball bearings one of whose rings is fixed and the other of which is free.

8. A bearing as set forth in claim 6, wherein said axial stop elements comprise the cheeks of a hydrostatic stop including supporting fluid feed means provided in said collar for feeding cavities forming supporting shoes on each lateral face of the collar.

* * * * *